United States Patent [19]

Eisenstein

[11] Patent Number: 5,067,102

[45] Date of Patent: Nov. 19, 1991

[54] METHOD AND APPARATUS FOR DISPLAYING AND EDITING MATHEMATICAL EXPRESSIONS IN TEXTBOOK FORMAT

[75] Inventor: Gabe L. Eisenstein, Corvallis, Oreg.

[73] Assignee: Hewlett-Packard Company, Palo Alto, Calif.

[21] Appl. No.: 472,684

[22] Filed: Jan. 31, 1990

[51] Int. Cl.⁵ .................................................. G06F 3/00
[52] U.S. Cl. ............................ 364/709.12; 364/709.06
[58] Field of Search ..................... 364/709.12, 709.14, 364/710.1, 710.05, 709.01

[56] References Cited

U.S. PATENT DOCUMENTS

| | | | |
|---|---|---|---|
| 4,386,412 | 5/1983 | Ito | 364/709.06 X |
| 4,507,743 | 3/1985 | Haneda et al. | 364/709.14 |
| 4,580,235 | 4/1986 | Yanagawa | 364/710.05 |
| 4,811,257 | 3/1989 | Sumitani et al. | 364/709.01 |
| 4,821,228 | 4/1989 | Wickes et al. | 364/710.05 X |
| 4,852,057 | 7/1989 | Patton | 364/709.06 |

FOREIGN PATENT DOCUMENTS 0101950 7/1984 European Pat. Off. .

*Primary Examiner*—Dale M. Shaw
*Assistant Examiner*—Tan V. Mai

[57] ABSTRACT

A calculator programmed for displaying in textbook format a mathematical expression as it is entered. This format is the way the expression would appear if presented in a textbook or if written with pencil and paper. As a key is pressed, the associated object, such as an alpha character or mathematical symbol, appears on the display screen in textbook format. A cursor is provided which responds to currently entered objects for indicating where the next object to be entered will be displayed. In displaying objects, the calculator is also context sensitive. It responds to currently entered objects by controlling the display of the next object to maintain the textbook format of the expression. Other features include syntax checking of the mathematical expression as its objects are being entered, and implicit entering and displaying of objects in response to entry of a predetermined pattern of objects.

10 Claims, 8 Drawing Sheets

FIG. 4

$$2 \cdot X + Y \cdot LOG(X) + Z \cdot \frac{X+Y}{2} \square$$

PARTS | PROB | HYP | MATR | VCTR | BASE

NO ☒ NECESSARY
WHEN ENTERING X OR LOG

FIG. 7A

[ ' ] X [ $y^x$ ] 2 [ − ]⁵⁴ Y [ENTER] [ENTER]

FIG. 7B

[↰] [EQUATION]
[↱] [∫] 0 [▶] 10 [▶]

$$\int_0^{10} \square$$ ³⁶

PARTS | PROB | HYP | MATR | VCTR | BASE

FIG. 7C

[↱] [RCL]

$$\int_0^{10} X^2 - Y \square$$ ⁵⁴ ³⁶

PARTS | PROB | HYP | MATR | VCTR | BASE

FIG. 7D

[▶] X [▶]
[+] [▲] [↱] [RCL] [▶]
2 [▶]

$$\int_0^{10} X^2 - Y \, dX + \frac{X^2 - Y}{2} \square$$ ⁵⁴ ⁵⁴ ³⁶

PARTS | PROB | HYP | MATR | VCTR | BASE

METHOD AND APPARATUS FOR DISPLAYING AND EDITING MATHEMATICAL EXPRESSIONS IN TEXTBOOK FORMAT

BACKGROUND OF THE INVENTION

This invention relates to portable computing devices such as calculators and, more particularly, to the format for displaying information on the device's display screen.

Portable computing devices such as calculators typically display information line-by-line, like the text on this page. This information may include mathematical expressions such as equations having variables, operators and other symbols which are displayed in a single-height linear format. More advanced devices include a larger display screen that can display several lines of information simultaneously. But in neither case is the information displayed in the form most familiar to the user-the way it appears printed in textbooks and journals and the way a user normally writes it with pencil and paper. To most users, mathematical expressions displayed in the more familiar "textbook" or "graphical" format are easier to read and understand than expressions displayed in the linear format.

SUMMARY OF THE INVENTION

An object of the invention, therefore, is to provide means for displaying mathematical expressions in a textbook format on a portable computing device.

A second object of the invention is to provide a means for controlling the display of the mathematical expression as it is entered into the portable computing device to maintain the textbook format without user assistance.

Another object of the invention is to provide syntax checking of a mathematical expression as it is entered in textbook format.

Yet another object of the invention is to permit simple editing of a mathematical expression displayed in textbook format.

To achieve these objects a portable computing device having a display screen and keyboard includes method and apparatus for displaying in textbook format a mathematical expression comprised of objects such as variables, operators, syntactic symbols and numbers. The apparatus comprises a plurality of keys for entering objects into the portable computing device to form a mathematical expression. Displaying means is responsive to a key press for displaying an object associated with the key in textbook format. A cursor (36) is responsive to a currently entered object for indicating where a next object to be entered will be displayed. The displaying means is further responsive to a currently entered object for controlling the display of the next object to maintain the textbook format of the expression.

Additional features include the implicit entering and displaying of an object in response to entry of a predetermined pattern of objects, such as a multiplier operator automatically inserted between two objects forming the predetermined pattern. To further assist the user, means is also provided for checking the syntax of the mathematical expression as objects are entered to be displayed. For example, the syntax checking means checks the syntax of the mathematical expression after entry of an object following a mathematical operator.

The foregoing and other objects, features and advantages of the invention will become more apparent from the following detailed description of a preferred embodiment with reference to the accompanying drawings.

BRIEF DESCRIPTION OF THE DRAWINGS

FIG. 4 is a view of the display screen illustrating the implicit entry and display of an object in a mathematical expression in response to entry of a predetermined pattern of objects.

FIGS. 7a-7d are views of the display screen illustrating the insertion of an object from a storage location of the calculator into a mathematical expression in textbook format.

DETAILED DESCRIPTION OF A PREFERRED EMBODIMENT

Figure 1:
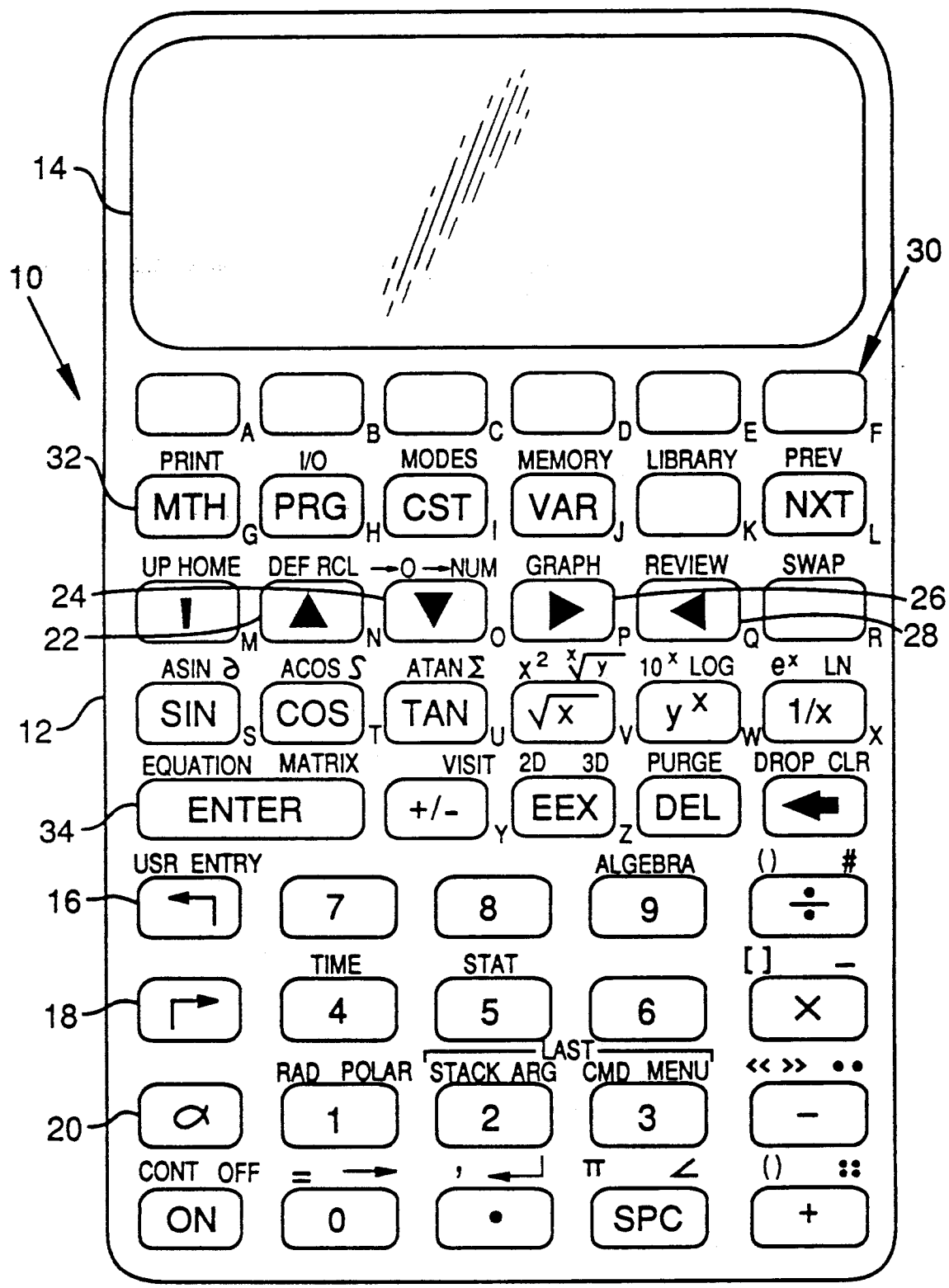
FIG. 1 is a view of a calculator which includes apparatus according to the invention.
Figure 9:
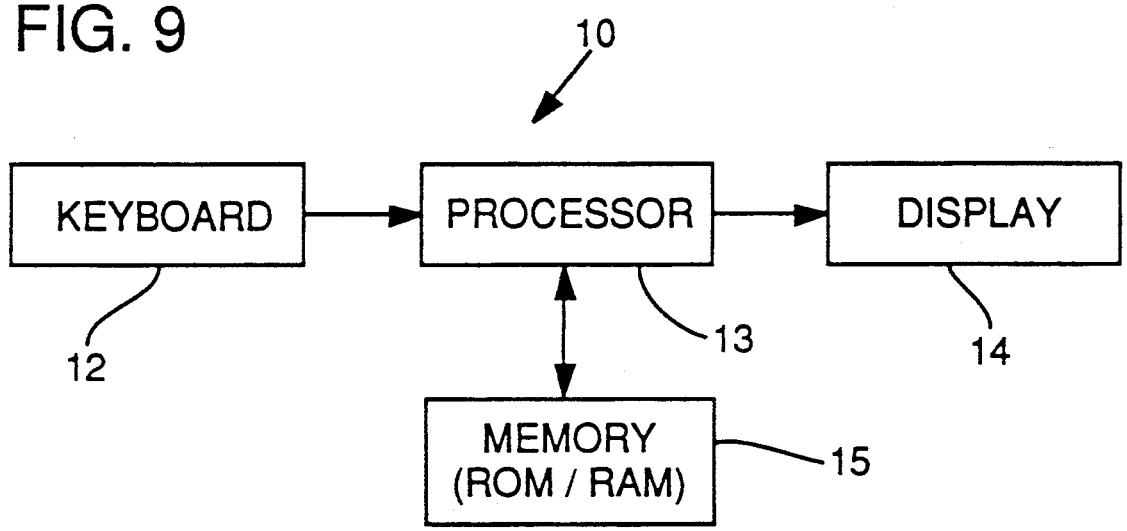
FIG. 9 is a block diagram of the architecture of the calculator of FIG. 1.

FIGS. 1 and 9 illustrate a portable computing device such as a calculator 10 in which the present invention is implemented. From a hardware perspective, calculator 10 includes a keyboard 12, multi-line liquid crystal display screen 14, a central processing unit 13 and program and data memory 15. Through programs executed by the central processing unit, textual and graphics characters entered at the keyboard 12 may be written to the display screen. Calculations are normally handled in a command line which appears near the bottom of screen 14. The command line displays information such as an equation as it is entered. Results from execution information on the command line may then be stored in various memory locations in the calculator. A good example of such a device is the Hewlett-Packard 28S calculator. Calculators of this type may also have multi-action keys, as indicated by the key definitions above, on and below each key. Each key has a primary key action shown on its face. Three of the primary keys, when pressed, redefine the key actions to match one of the other definitions. Key 16, for example activates the key action above and to the left of each key. Key 18 activates the key definition above and to the right of each key. And key 20 activates the key definition to the lower right of each key. The keys labeled 22-28 are cursor keys for controlling the movement of a cursor around the display screen 14. The top row 30 of keys are menu keys. The current functions of these keys are defined by menu labels that appear immediately above row 30 in the display screen. The menu labels are part of a menu selected by pressing a key. For example, pressing key 32 will display menu labels relating to math functions.

Figure 2:
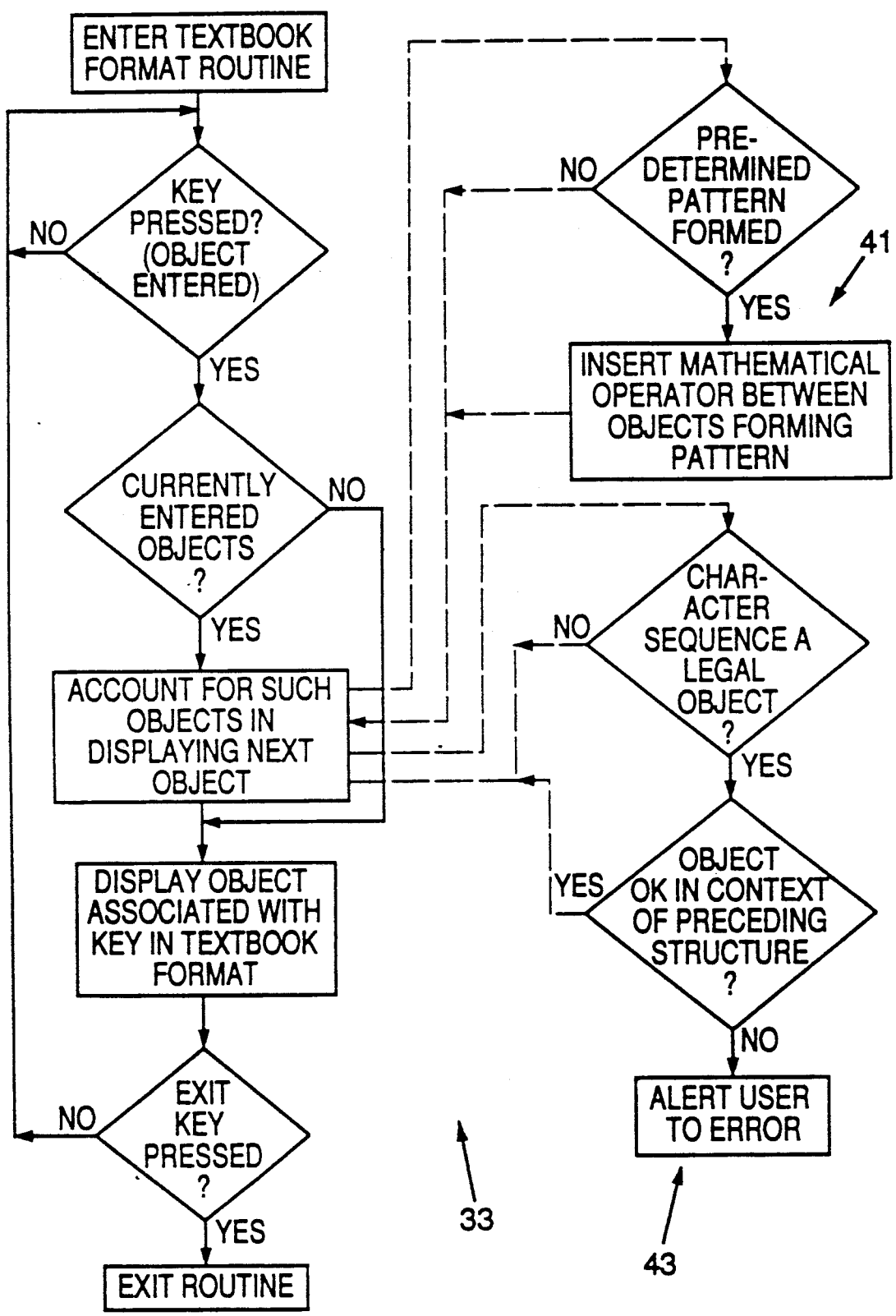
FIG. 2 is a flowchart illustrating the operation of the calculator according to the invention.

With this background, the present invention is described as implemented in a calculator embodiment. FIG. 2 is a flowchart 33 that illustrates the operation of program routines according to the invention. It should be understood, however, that the following description of the invention is intended only as an example and not as a limitation to this embodiment. For clarity, items of information that can be separately entered or displayed are referred to as objects. An object may have parts or arguments that are also objects themselves. Expressions of objects such as a mathematical operator with arguments may also be referred to as objects. For example, A⌃B may be a subexpression of a larger mathematical expression. In different contexts, a subexpression may be entered and displayed as one object or its parts may be separately entered and displayed as objects. Other examples of objects include mathematical symbols, alpha characters (letters) and numbers.

Referring now to FIGS. 1-3, the textbook format routine is entered by pressing keys 16 and 34 in succession. This action activates displaying means such as a program within the calculator's memory. The displaying means responds to further key presses by displaying objects associated with the keys in textbook format on the screen 14. By pressing various keys including action defining keys 16-18, a mathematical expression comprised of objects can be entered and displayed. In FIG. 3a, for example, several objects are shown displayed in response to key presses. At the end of the objects is a cursor 36 that responds to objects currently entered in the mathematical expression by indicating where a next object to be entered will be displayed. This responsiveness can be appreciated by comparing the positions of the cursor in FIG. 3a and FIG. 3b. In the first figure, the preceding objects are variables followed by an addition operator 38. The next object to be entered then appears opposite the addition operator. This next object entered (FIG. 3b) is an integral sign 40 which is positioned where the cursor previously appeared. An integral sign, however, takes two arguments that appear at the top and bottom of the sign, respectively. Cursor 36 responds to entry of the integral sign 40 by moving to the bottom of the sign to indicate where the next object, the lower limit of integration, will be displayed. The user thus does not have to determine where the next object is to be displayed.

The means for displaying objects also responds to the context of the preceding expression structure in controlling the display of the next object. For example, the lower and upper limits of integration are displayed in their proper locations with appropriate sizing. And in FIG. 3e, the "d" preceding the variable of integration t is automatically inserted once t is entered.

Figure 3A:
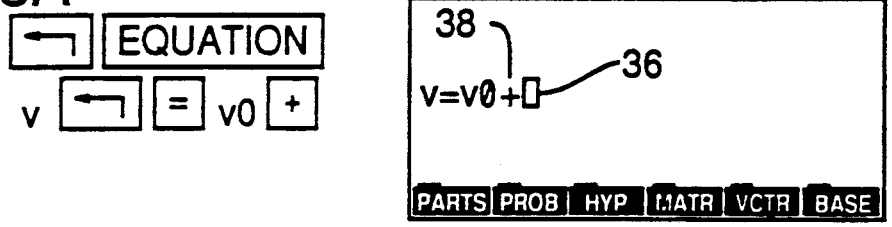
FIGS. 3a-3f are views of the display screen of the calculator illustrating the display of a mathematical expression in textbook format as it is entered.
Figure 3B:
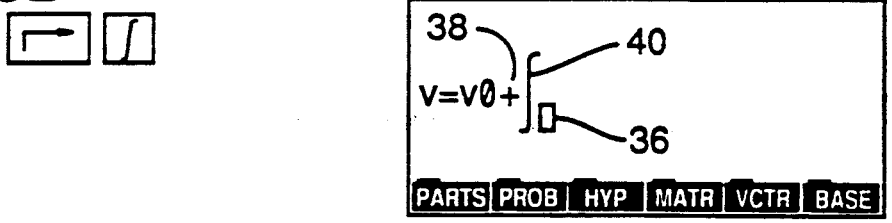
Figure 3C:
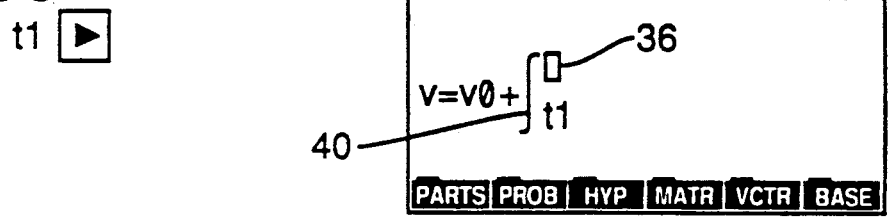
Figure 3D:
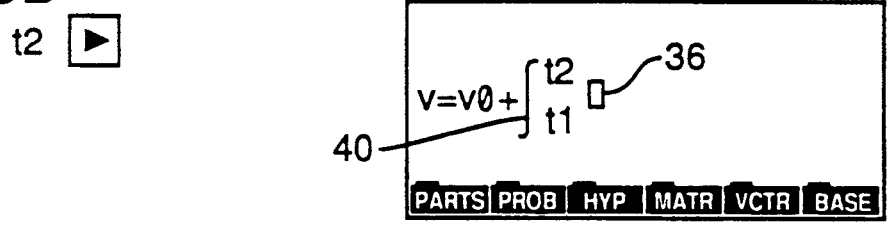
Figure 3E:
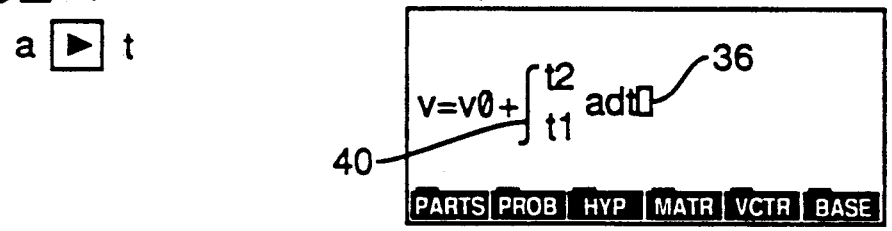

FIGS. 3c-3e also illustrate how a subexpression of objects is ended. In FIG. 3c, objects entered with the cursor at the lower limit will be considered part of a subexpression for that limit until the user ends the subexpression. Pressing the cursor key 26 ends the subexpression and causes the cursor 36 to move to the upper limit. In FIG. 3d, a subexpression is similarly entered and ended, causing the cursor to move back to the center of the integral for entry of the integrand. In FIG. 3e, pressing the cursor key 26 and "t" ends the integrand and causes the displaying means to respond to the context by displaying the "d" before the "t." The integral sign 40 is but one example of the context sensitivity of the displaying means. Other objects that clearly illustrate it include the summation and nth root functions.

Figure 3F:
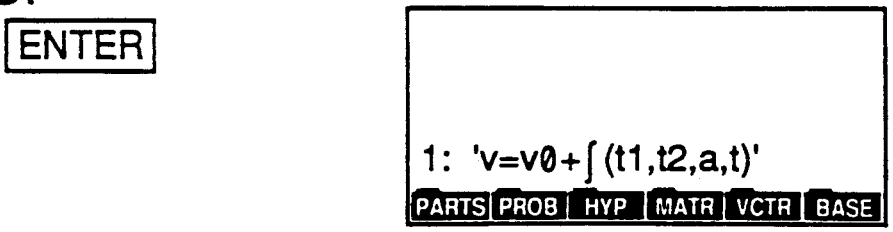

Means are also provided for entering a mathematical expression displayed in textbook format into a storage location of the calculator for computation. As shown in FIG. 3f, a program in the calculator's memory responds to the pressing of key 34 to display the expression in linear form. This action also serves to exit the textbook routine.

Referring again to FIG. 2, means such as an additional program routine (41) is provided for implicitly entering and displaying an object in response to entry of a predetermined pattern of objects. FIG. 4 shows the operation for the case of multiplication. When "X" is entered immediately after "2", a multiplier operator "•" is automatically inserted between the two objects. These predetermined patterns include, among others, a number followed by an alpha character and an alpha character followed by a prefix function (a function whose arguments(s) appear after its name). For that reason a "•" is also automatically inserted between "Y" and "LOG" when the [LOG] key is pressed.

Additional help for the user is provided by means for checking the syntax of the mathematical expression as objects are entered to be displayed. FIG. 2 illustrates operation of a program routine (43) for one type of syntax checking, that of checking against incorrect entries of mathematical operators. The program first checks to see if the sequence of characters entered is a legal object. If not, it alerts the user to the error. If yes, it then checks to see if the legal object is permitted in the context of the preceding structure of the expression. If not, it alerts the user to the error.

Figure 5A:
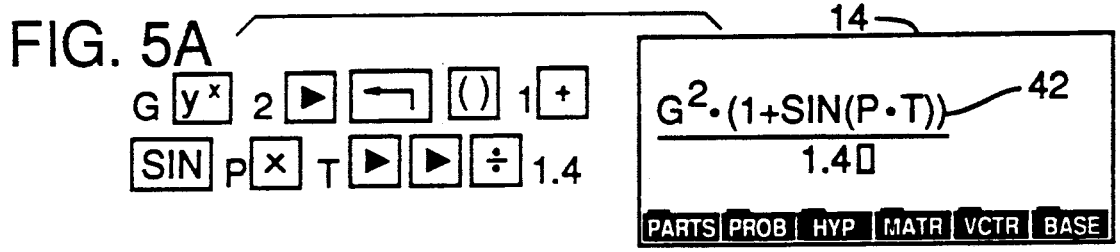
FIGS. 5a-5g are views of the display screen illustrating the entering of a mathematical expression in textbook format into a storage location in the calculator and recall of the expression.
Figure 5B:
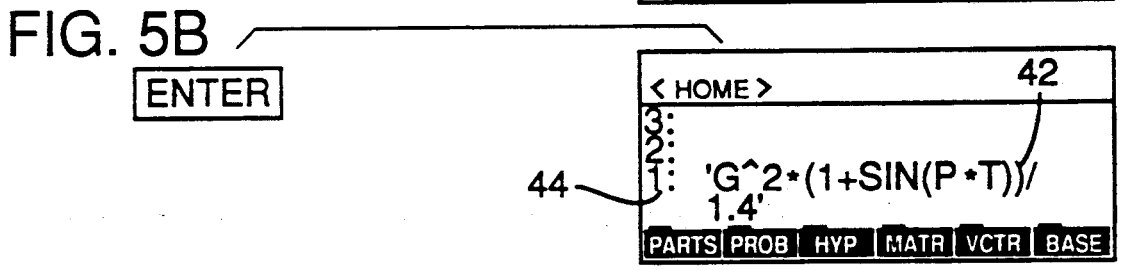
Figure 5C:
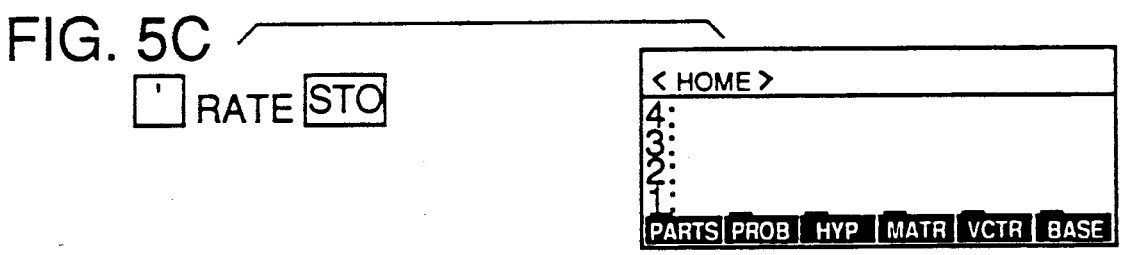
Figure 5D:
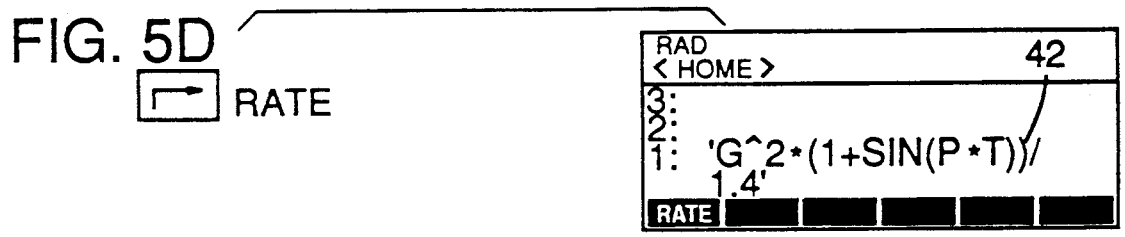
Figure 5E:
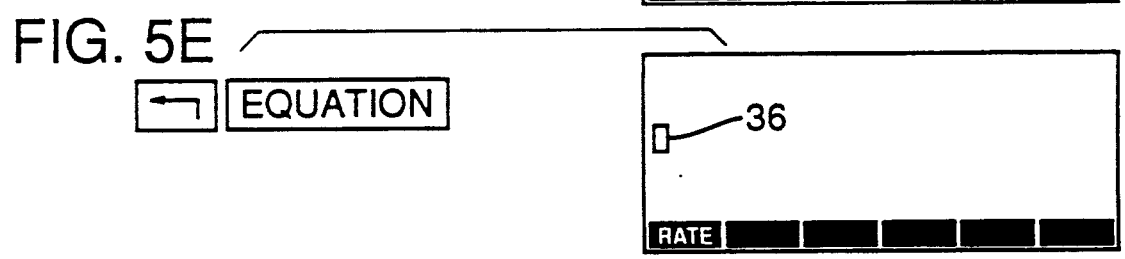
Figure 5F:
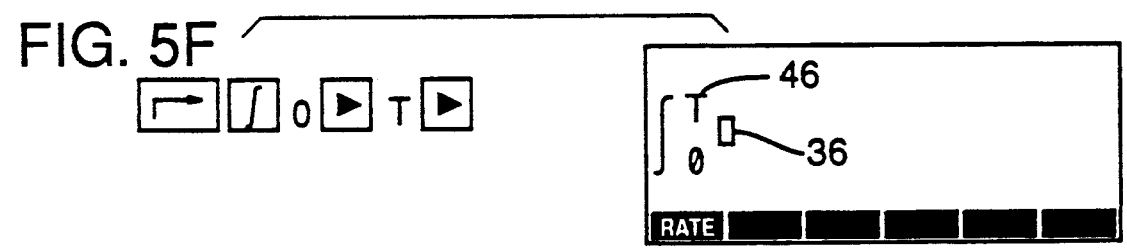
Figure 5G:
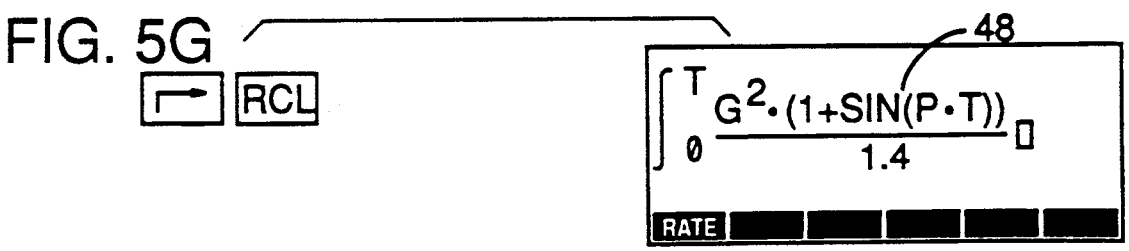

As briefly described above, calculator 10 includes means for entering a mathematical expression displayed in textbook format into a storage location of the calculator 10 for purposes of computation. The converse is also true. Objects or expressions presently in a storage location can be recalled for display in textbook format. FIGS. 5a-5g illustrate the movement of a mathematical expression between a textbook format on the display screen 14 to a storage location 44 and its recall and combination with other objects to form a new mathematical expression. In FIG. 5a, a first expression 42 is entered and displayed in textbook format. In FIG. 5b and 5c, the expression is first entered into memory on the calculator's stack 44 and then stored in a storage location under the variable "RATE." In FIG. 5d, "RATE" is recalled to the stack. To insert "RATE" into another expression, keys 16 and 34 are again pressed and cursor 36 appears (FIG. 5e). Several objects 46 for a new expression may then be entered (FIG. 5f) before the expression represented by "RATE" is recalled and combined into a new mathematical expression 48.

Figure 6A:
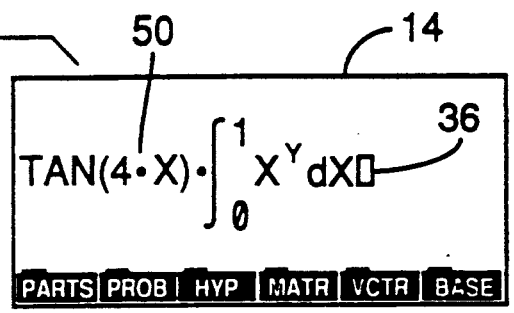
FIGS. 6a-6e are views of the display screen illustrating the editing of a mathematical expression in textbook format.
Figure 6B:
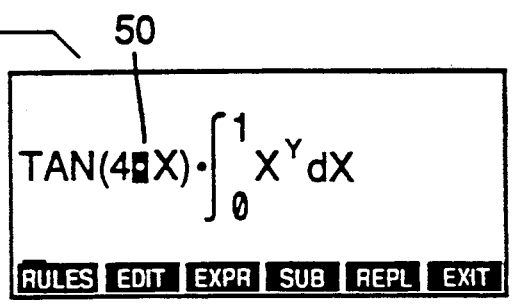
Figure 6C:
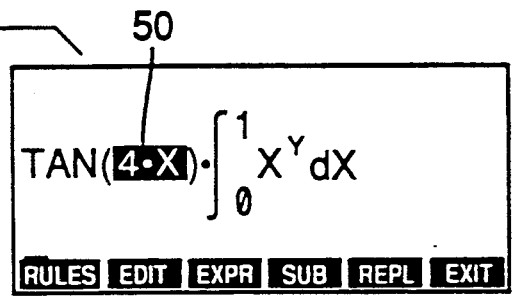
Figure 6D:
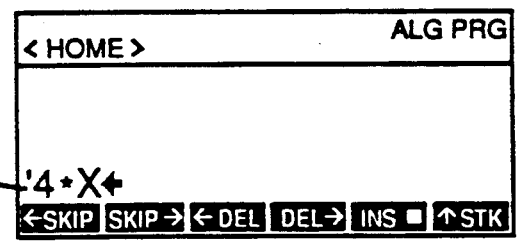
Figure 6E:
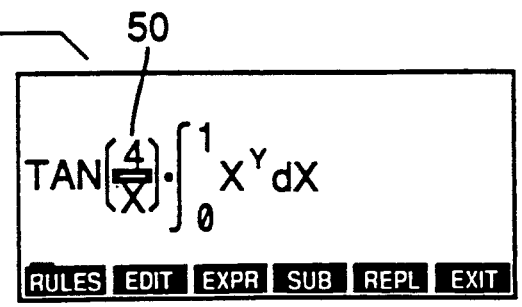

In addition to entry and recall of mathematical expression in textbook format, means are provided for editing such expressions. One such means comprises a program routine whose operation is illustrated in FIGS. 6a-6e. FIG. 6a illustrates a completed expression in which it is desired to change the multiplier operator of tangent argument 50 to a divisor operator. Pressing key 28 changes to a Selection menu and the menu labels change appropriately. The cursor 36 may then be moved to the multiplier operator of subexpression 50, as shown in FIG. 6b. The subexpression, for which the operator is the top level function, may then be highlighted, as in FIG. 6c, by pressing the menu key EXPR. This highlighting allows the user to determine if he has the correct object for editing. If so he presses another menu key EDIT, as shown in FIG. 6d, which returns the subexpression to the calculator's command line 52 for editing. The user then edits the subexpression using the appropriate keys and returns the subexpression to the display screen by pressing key 34 (FIG. 6e).

Figure 8A:
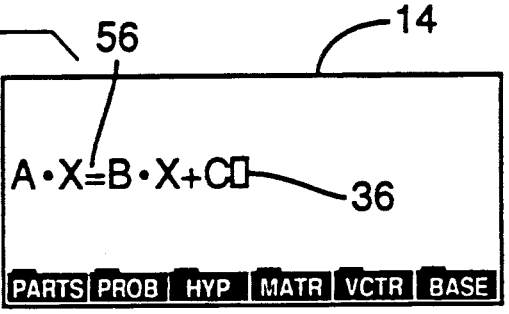
FIGS. 8a-8e are views of the display screen illustrating the rearrangement of a mathematical expression in textbook format without changing the expression's value.
Figure 8B:
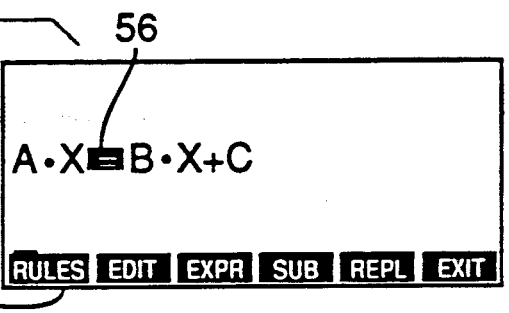
Figure 8C:
Figure 8C:
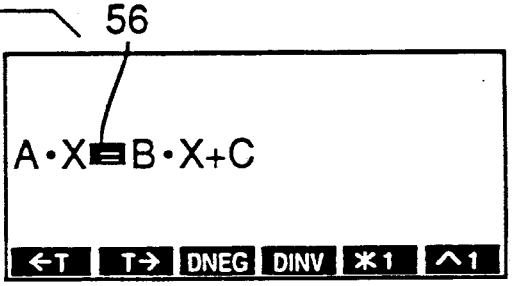
Figure 8D:
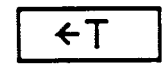
Figure 8D:
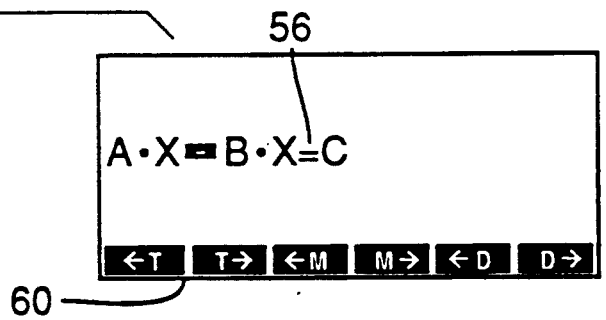
Figure 8E:
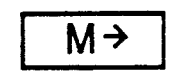
Figure 8E:
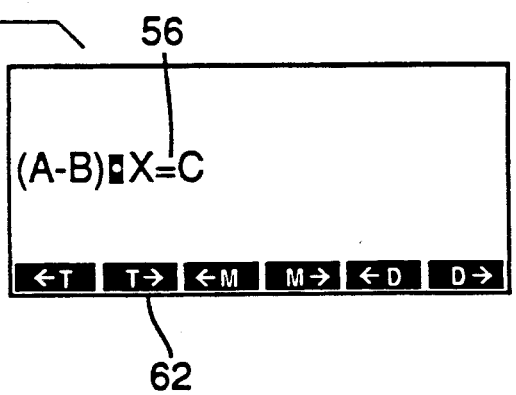

Another editing means comprises a program routine whose operation is illustrated in FIGS. 7a-7d. The program allows for insertion of an object from a storage location of the calculator 10 into the mathematical expression at the current location of the cursor. FIG. 7a shows an object 54 that has been entered and then copied onto the calculator stack at some point. In FIG. 7b, the textbook format i activated by pressing keys 16 and 34 in succession and an integral sign 40 and its arguments are entered and displayed. By pressing the keys shown in FIG. 7c, the object 54 is then inserted from the stack into the displayed expression at the location of the cursor. FIG. 7d illustrates further entry of objects from the keyboard and insertion of another copy of object 54. This feature thus permits a user to create a library of frequently-used subexpressions for building larger mathematical expressions.

Where the mathematical expression is an equation, an unknown to be solved for may initially appear on both sides of the equation. The present invention includes means such as a program routine for rearranging the expression to produce only one occurrence of the unknown without changing the equation's value. The unknown can then be isolated and solved for using the computational power of the calculator 10. FIGS. 8a-8e illustrate this feature. In FIG. 8a, an equation is entered in textbook format as previously described. The unknown variable "X" appears on both sides of the equation. To collect the Xs, the user activates the Selection menu by pressing the cursor key 28 and moves the cursor until it covers the = sign 56 (FIG. 5b). The user then selects the RULES menu 58, indicated by the left menu label, by pressing the associated menu key (FIG. 5c). The subexpression or term "B•X" is moved to the left side of the equation by pressing the menu key associated with "move term left" label 60 shown in FIG. 5d. With both occurrences of X now on the same side of the equation, they can be merged using the distributive property by pressing the menu key associated with a "merge" label 62 shown in FIG. 8e. X now occurs only once in the equation. From this point the equation can be entered into a storage location and, using other calculator commands, isolated for a solution.

Having illustrated and described the principles of the invention in a preferred embodiment, it will be apparent to those skilled in the art that there can be many equivalent variations of the present embodiment without departing from these principles. Therefore, the present embodiment is intended only as an example of the invention and not as a limitation on its scope. For example, all or portions of the described program routines may be implemented in equivalent hardware if so desired. I therefore intend to cover all such variations which come within the spirit and scope of the following claims that define the invention.

I claim:

1. In a hand-held calculator having a display screen and keyboard, apparatus for displaying in textbook format a mathematical expression comprised of objects, comprising:
    a plurality of keys for entering objects into the calculator to form a mathematical expression;
    means responsive to a key press for displaying an object associated with the key in a nonlinear textbook format;
    means for implicitly entering and displaying an object in response to entry of a predetermined pattern of objects; and
    a cursor responsive to a currently entered object for indicating where a next object to be entered is displayed,
    the displaying means further responsive to a currently entered object for controlling the display of the next object to maintain the textbook format of the expression.

2. The apparatus of claim 1 wherein the means for implicitly entering and displaying an object displays a multiplier operator between two objects forming the predetermined pattern.

3. The apparatus of claim 1 including means for checking the syntax of the mathematical expression as objects are entered to be displayed.

4. The apparatus of claim 1 including means for entering the displayed mathematical expression into a storage location of the calculator for computation.

5. The apparatus of claim 1 including means for inserting an object from a storage location of the calculator into the mathematical expression at the current location of the cursor.

6. The apparatus of claim 1 including means for rearranging the mathematical expression without changing its value.

7. The apparatus of claim 1 including editing means comprising:
    means for selecting an object of the mathematical expression for editing;
    means for moving the selected object between the display screen and a storage location for editing; and
    means for editing the object while in the storage location.

8. The apparatus of claim 1 wherein the displaying means comprises a computer program within the calculator.

9. The apparatus of claim 1 wherein the hand-held calculator includes a multi-action keyboard and keys for defining which of the multiple actions is active.

10. In a hand-held calculator having a display screen and keyboard, apparatus for displaying in textbook format a mathematical expression comprised of objects, comprising:
    a plurality of keys for entering objects into the calculator to form a mathematical expression;
    means responsive to a key press for displaying an object associated with the key in a nonlinear textbook format;
    means for recalling a mathematical expression from within a storage location of the calculator for display in the textbook format; and
    a cursor responsive to a currently entered object for indicating where a next object to be entered is displayed.
    the displaying means further responsive to a currently entered object for controlling the display of the next object to maintain the textbook format of the expression.

* * * * *